FIG. 2.

INVENTOR
Robert F. Couret

FIG. 6.

United States Patent Office 3,221,362
Patented Dec. 7, 1965

---

3,221,362
APPARATUS FOR REMOVING THE EDIBLE MEATS FROM CRUSTACEA TAILS
Robert F. Couret, New Orleans, La., assignor, by mesne assignments, to The Laitram Corporation, New Orleans, La., a corporation of Louisiana
Filed Jan. 18, 1963, Ser. No. 252,530
8 Claims. (Cl. 17—2)

The present invention relates to apparatus for removing the edible meats from crustacea tails, and is a continuation-in-part of my similarly entitled copending application, Serial No. 65,455, filed October 27, 1960, now abandoned, and has for an object to provide an apparatus for removing the edible meat from the Dublin Bay prawn known as *Nephrops Norvegica* and which is commercially known as scampi.

The prawn has an exceptionally hard shell unlike the soft and pliable shell on shrimp and which shell has sharp razor-like edges and is exceptionally difficult to peel manually. When manual peeling of this prawn has been attempted in the past it has been time-consuming and the hands of the peeler have frequently been cut.

The prawn has a very delectable and edible meat when the meat is removed intact from the shell. Because of the rigid armor-like shell, subjecting the prawn to a rolling nip or squeezing action to eject the meat therefrom has not been a satisfactory solution and in effect results in a multilated meat.

The prawn contains a large vein or mid-gut down the center of its back inwardly of the outer surface of the meat and deveining the prawn has been another problem. I have found that the prawn can be de-veined while the meat is still in the prawn shell by boring adjacent to the vein to sever the vein from contact with the shell and upon completion of the boring, applying a negative pressure or suction to the hollow bore of the boring instrument to draw off the severed vein from the meat.

When the prawn has been de-veined, I have found the prawn meat to be ejected from the shell by applying fluid pressure internally of the prawn shell in the telson area generally within the last two joints of the prawn tail. The fluid under pressure in view of the extreme hardness of the shell builds up a back pressure against the shell between the meat and shell and when a sufficient pressure is applied, the fluid under pressure combined with the reaction thrust of the fluid ejects the prawn meat completely from the shell leaving an un-mutilated, eye-appealing, commercially desirable, fully peeled and de-veined prawn meat.

Another object of the present invention is to provide an apparatus for practicing the process of de-veining and removing the prawn meat from the shell on a continuous basis, automatically without the need for human effort to insert the boring instrument for removal of the vein or the need for human insertion of the fluid pressure means for causing the meat to be ejected from the shell a suitable distance to facilitate mechanical segregation of edible meats and shells when discharged from apparatus.

With the foregoing and other objects in view, the invention will be more fully described hereinafter, and will be more particularly pointed out in the claims appended hereto.

In the drawings, wherein like symbols refer to like or corresponding parts throughout the several views.

The process of the present invention may be practiced by hand or manually in which event the operator would grasp the prawn tail having the meat within the shell in one hand and with the other hand he would insert a coring device to separate the vein from the prawn shell. Thereafter the operator with the meat still in the shell would introduce a fluid pressure means which may be in the form of a needle connected to a fluid pressure supply through the shell at its closed end and referred to generally as the telson at a point within the last two joints of the telson section.

The operator would then release a blast of fluid pressure in the fluid line whereby the fluid pressure would pass through the needle into the prawn tail and by reaction thrust between the fluid under pressure, the prawn shell and the meat, the meat would be ejected in a whole and un-multilated state from the shell. I have found that satisfactory ejection of the meat from the shell is obtained with a fluid pressure ranging from 12 to 60 p.s.i. gauge.

While the process may be practiced by hand and a satisfactory end product obtained, I have devised a form of apparatus for automatically handling a large number of prawn in a series of step-by-step operations eliminating the dangers to the operator of handling the sharp prawn shells, the coring instrument and the fluid pressure needle.

Figure 1:
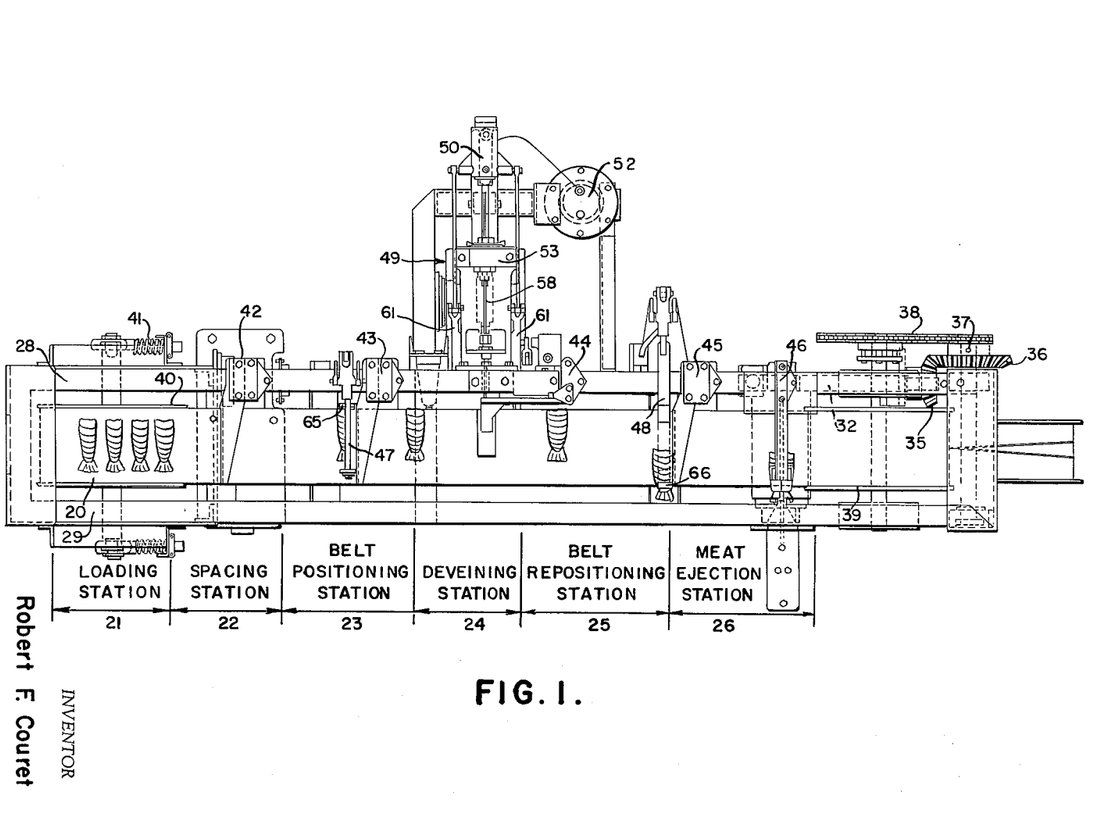
FIGURE 1 is a top plan view of one form of apparatus which may be employed in the practice of the process of the present invention.

In the form of apparatus illustrated, referring particularly to FIGURE 1, the machine comprises generally an endless belt 20 which is continuously driven from the left to the right-hand side of FIGURE 1 and along which belt are provided a plurality of stations. A loading station 21 is provided at the left-hand side of the machine where prawn are laid across the belt side-by-side. When the belt is advanced from left to right in FIGURE 1, the prawn are presented to a spacing station 22 which spaces the prawn along the length of the belt for the particular timed relationships of operations which will thereafter be imposed upon the prawn.

As the belt continues to advance to the right in FIGURE 1, the prawn are presented to a first belt positioning station 23 where the prawn are brought across the belt so that their open ends are brought against a stop at the edge of the belt. As the belt continues advancing to the right the thus positioned prawn is then presented to the de-veining station 24 where a coring device enters the open end of the prawn tail and severs the mid-gut or vein from the prawn meat and shell and at which station the thus severed vein is also removed. The prawn then advances to a second belt positioning station 25 where the prawn are pushed over to the opposite edge of the belt so that the tail or telson sections of the prawn partially overlie the edge of the belt 20. As the belt continues to move to the right, the prawn are introduced to the meat ejection station 26 where the prawn shell is first mechanically grasped and restrained and a fluid pressure needle is then inserted in the telson section of the prawn shell and pressure is applied to eject the prawn meat from the shell.

Figure 2:
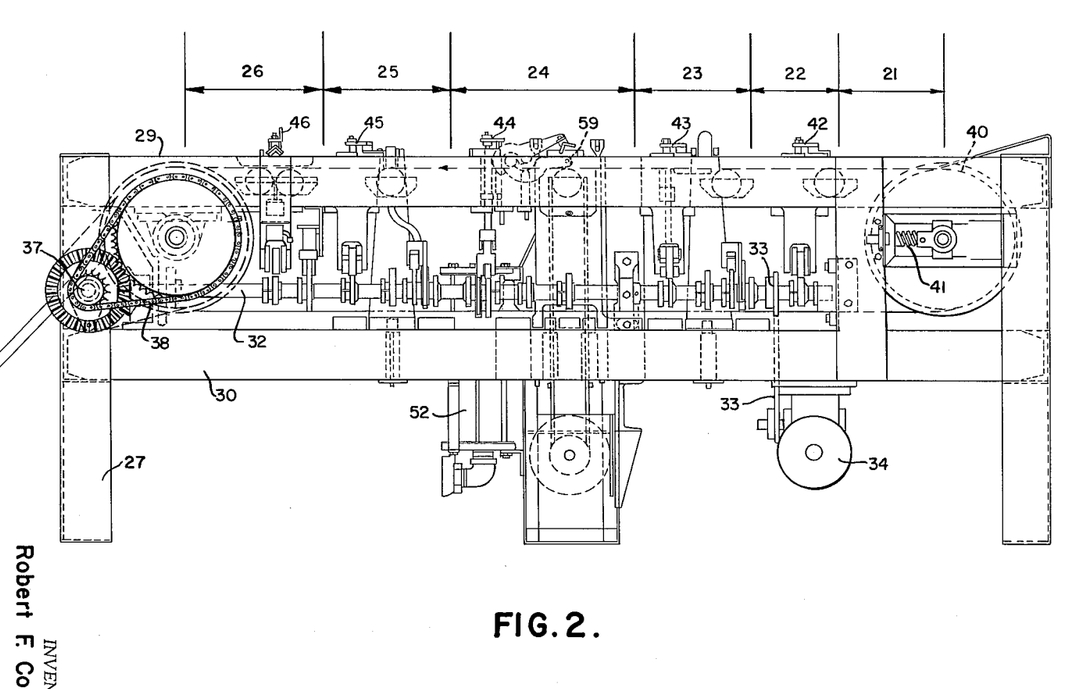
FIGURE 2 is a front elevational view of the machine of FIGURE 1.

Referring for the moment to FIGURES 1 and 2, the machine comprises a frame 27 which consists of a pair of top channel section supports 28 and 29 joined by cross members at their ends and a lower channel support beam structure 30, 31. Journalled in the frame is a cam drive shaft 32, which shaft is driven by a chain 33 which received rotary power from a motor 34. As seen best in FIGURE 1 the shaft 32 through bevel gears 35 and 36 drives a shaft 37 which through a chain and sprocket drive 38 drives a drum or friction roller 39.

The pair of drive drums 39 and 40 are journalled in the machine frame over which the endless belt 20 is carried tautly to be driven upon rotation of the drum 39 by actuation of the chain drive 38. The journals for the drum 40 are provided with an automatic slack take-up means 41 to keep the stainless steel endless belt 20 taut about the drums 39 and 40.

Carried by the frame member 28 in guide supports for vertical reciprocation by engagement of the base of the member with its operating cam carried by the cam shaft 32 are spacer member 42, belt positioning stop 43, prawn grasping and retaining means for de-veining 44, a second prawn belt positioning stop device 45 and a prawn engaging device 46 for restraining the prawn when fluid pressure is injected within the shell.

The foregoing movements are vertical and all can be described as operating in substantially the same manner except for the height control of the cams, each operating in a vertical sense falling by gravity and being raised by a cam lobe. The cam shaft 32 also controls three elements which have a side or swinging motion. These elements are the prawn belt edge positioning member 47, the prawn belt edge repositioning member 48 and a coring device 49. The coring head 49 is advanced in a direction toward the belt 20 and away from the belt 20, viewing FIGURE 1.

Figure 3:
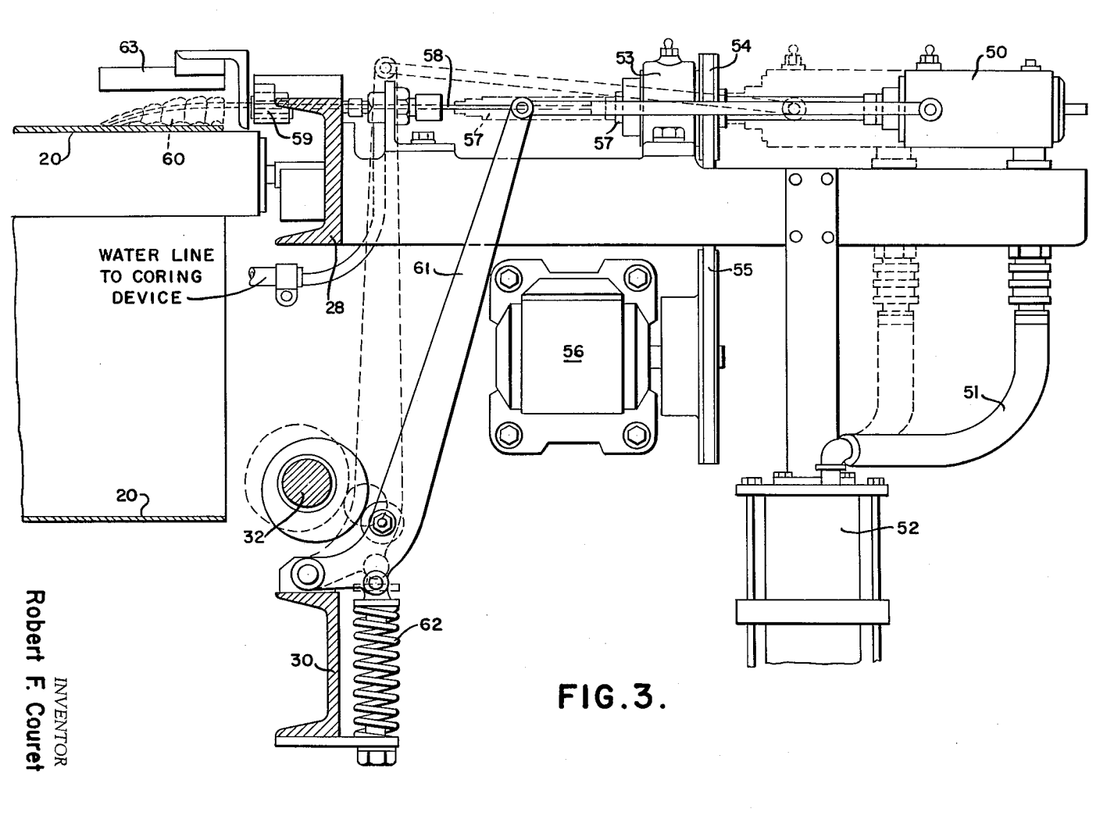
FIGURE 3 is a fragmentary transverse section taken at a magnified scale through the machine having parts shown in section and in dotted lines at the vein boring station.

The coring head assembly 49 is best shown in FIGURE 3 and consists of a slidable head carriage 50 connected through a flexible lead 51 to a vacuum chamber 52 which has a vacuum maintained therein at all times by a vacuum pump. To support the slide head 50 is a bearing 53 and a drive pulley 54 driven by a feed belt drive 55 from a pneumatic or electric motor 56. Extending forwardly of the bearing is a coring guide 57 for a coring member 58 extending therefrom which member 58 passes through an opening in a positioning member 59 to permit entry of the coring member 58 into a prawn 60. The rotary shaft 57 and coring member 58 have therebetween a supply of water to wash and lubricate the inner and outer surface of the coring member 58 which is of hollow plastic tube construction to facilitate its entry into the prawn meat about the vein. As shown in FIGURE 3, when the cam shaft 32 has rotated to the dotted line position, the coring drive arm 61 under the influence of springs 62 is moved from the solid line position in FIGURE 3 to the dotted line position whereby the slidable assembly is then moved to the dotted line position shown in FIGURE 3 at which time the rotatable hollow tube coring member 58 bores its way into the prawn about the vein, severing the vein from contact with the meat, and its end attachment to the shell.

When the boring operation has been completed, the vacuum chamber 52 is opened pulling a vacuum on the flexible lead 51 through the head 50, support member 57 and the coring member 58 to withdraw the severed vein from the prawn meat.

A first prawn engaging member 63 descends upon and restrains the prawn 60 prior to introduction of the coring member 58 into the prawn meat. Predicted by the sizes of individual prawns, member 63 also guides positioning member 59 to the proper point for introduction of coring member 58.

Figure 6:
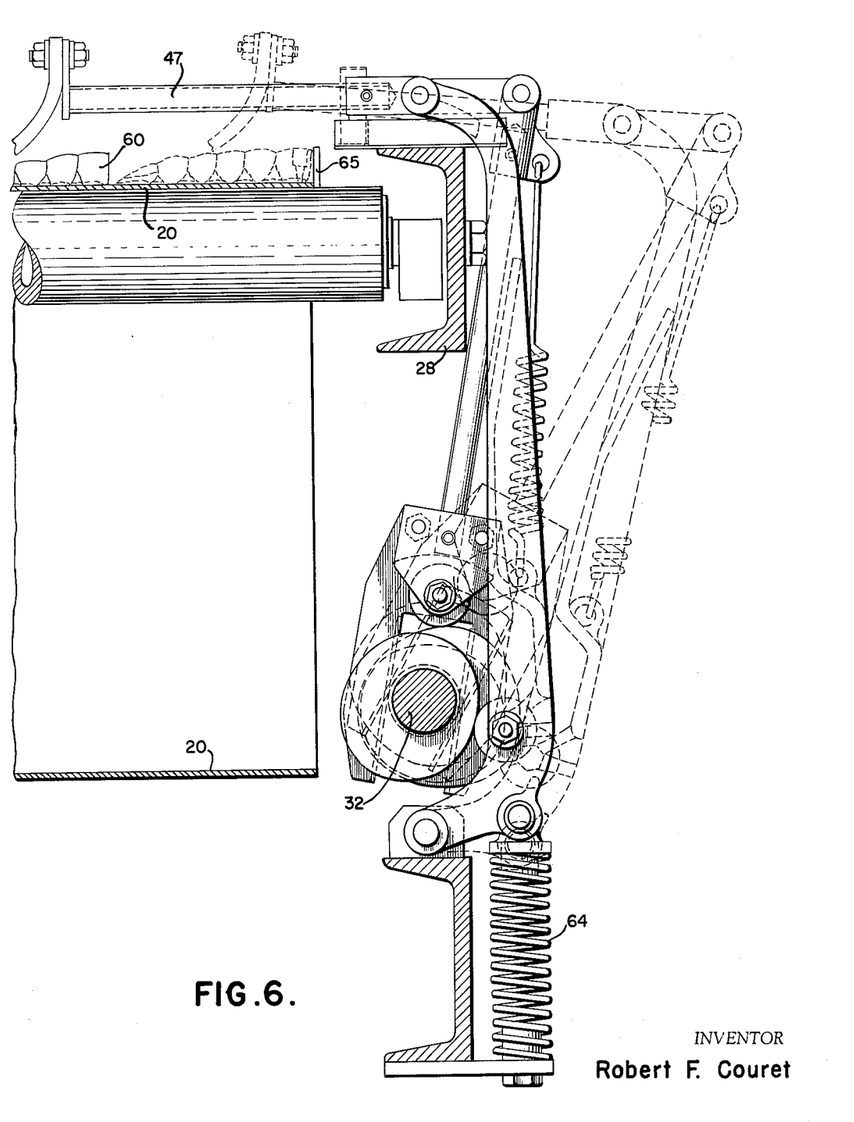
FIGURE 6 is a fragmentary transverse section taken through the machine at a magnified scale at one of the belt edge positioning stations.

Each of the other two members which partake of a swinging movement, that is the prawn belt edge positioning members 47 and 48, is pivoted to one side of the cam shaft 32 and as shown in FIGURE 6, the prawn positioning member 47 originates in the solid line position and upon rotation of the cam shaft 32 and under the influence of a spring 64 the member 47 is moved from the solid line position to the dotted line position in FIGURE 6. The prawn is moved from the solid line position to the dotted line position up against a stop member 65 carried by the belt edge positioning member 43. The prawn is now in a position to be advanced to the coring station; that is, with the open end of its shell ready to receive the coring member 58.

Figure 7:
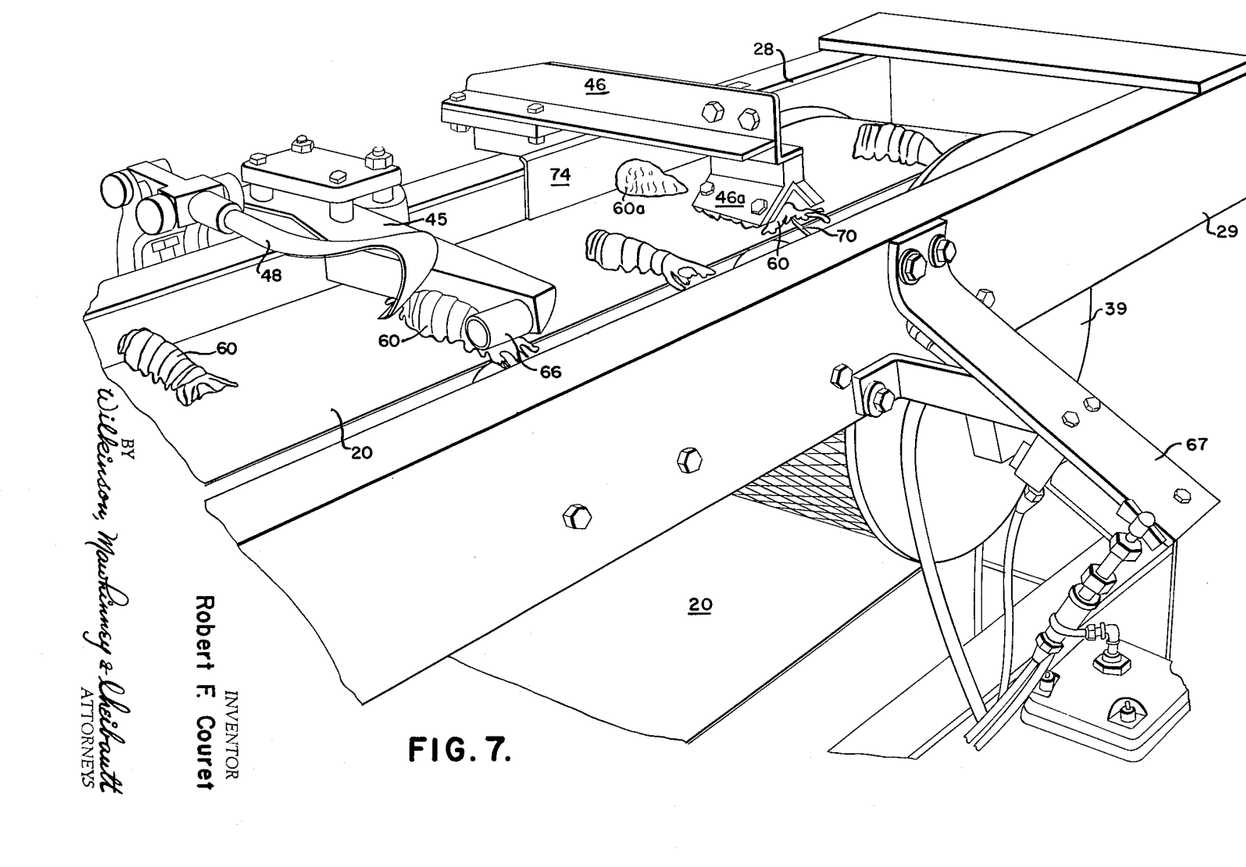
FIGURE 7 is a fragmentary perspective view of the machine of the foregoing figures showing the second belt edge positioning station and the meat ejection station.

Operating in a reverse manner as shown in FIGURE 7 is the belt edge repositioning member 48 which pushes the cored prawn from the coring edge of the belt across the belt 20 to its opposite edge until the telson of the prawn tail engages a limit stop 66 carried on the second prawn belt positioning member 45.

Figure 4:
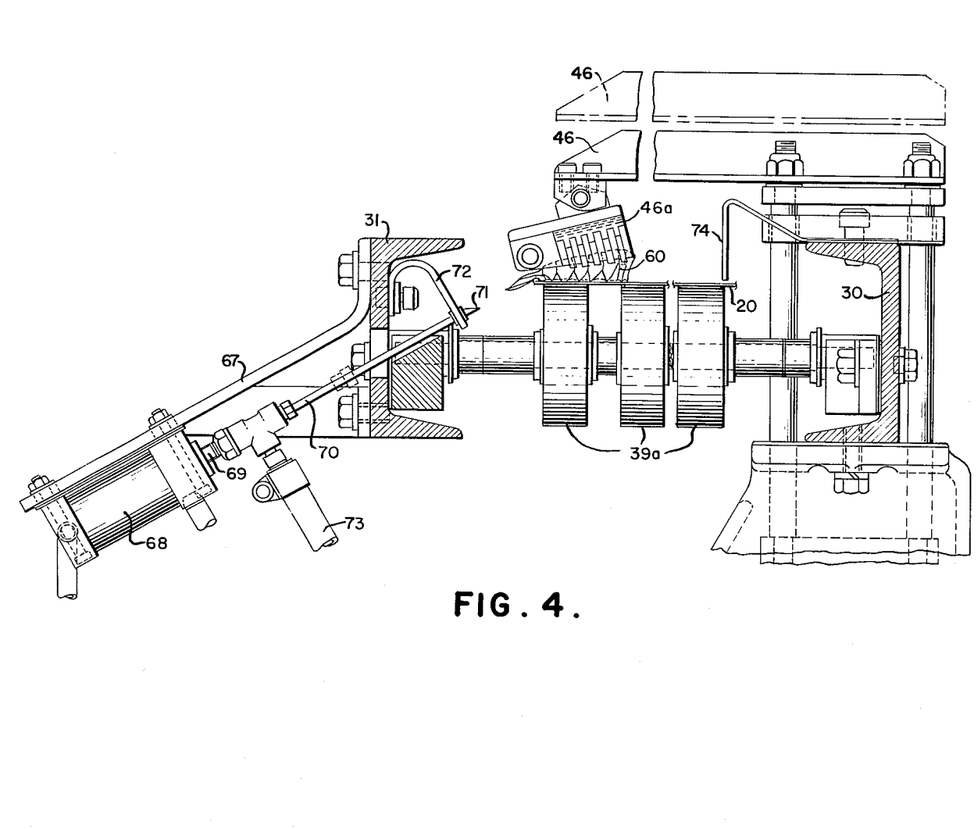
FIGURE 4 is a fragmentary transverse section taken at a magnified scale through the machine at the meat ejection station with the fluid pressure needle in the retracted position.
Figure 5:
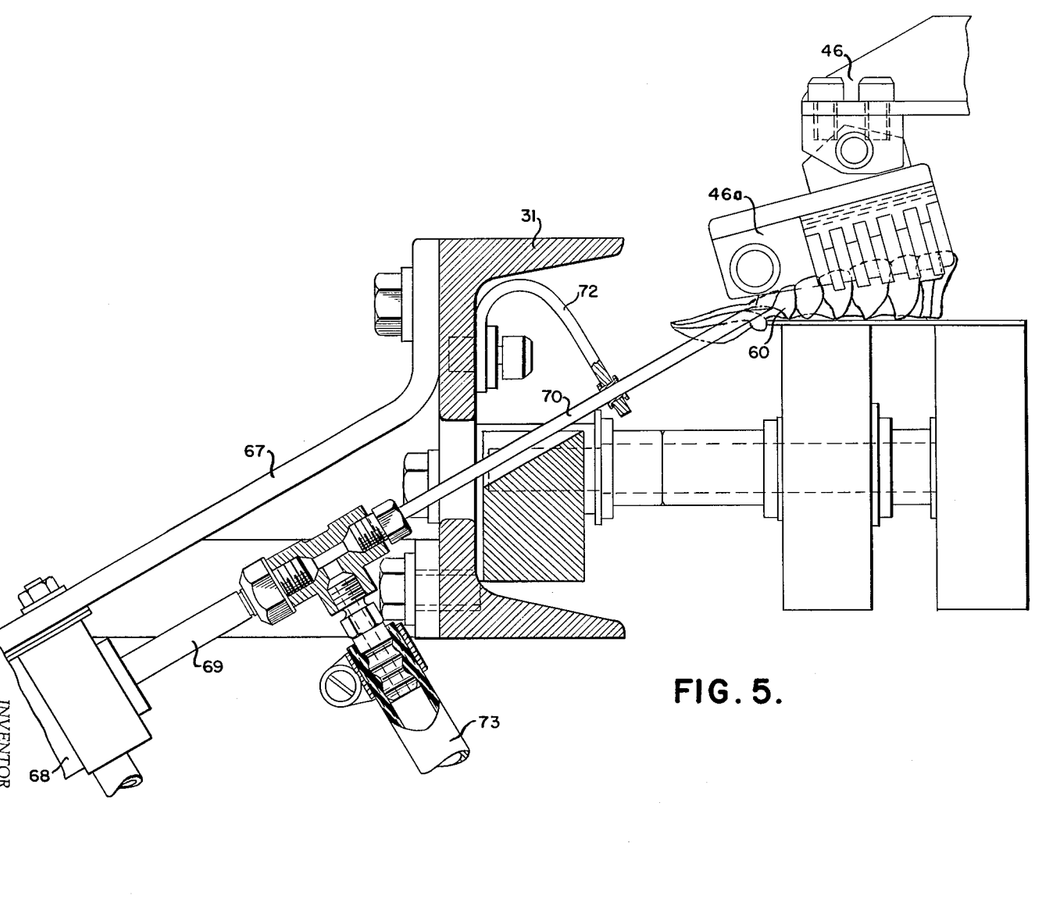
FIGURE 5 is a view similar to FIGURE 4 taken at a magnified scale showing the fluid injection needle in the thrust operation position.

Referring now to FIGURES 4 and 5, the details of the structure forming the meat ejection station, will now be described. Secured to the channel member 31 is an angle member 67 having a pneumatic cylinder 68 secured thereto. A piston 69 of the pneumatic cylinder carries a fluid pressure shell inserting hollow needle 70 having a beveled leading edge 71. The leading edge of the needle passes through a guide 72. When the prawn engaging device 46 descends from the dotted line position to the solid line position of FIGURE 4 and a prawn restraining member 46ª engages the prawn 60 with the telson or tail end of the prawn partially overhanging the endless belt 20, the plunger or piston 69 is driven forwardly, as seen in FIGURE 5, causing the needle 70 to enter the telson area of the prawn 60 at which time a blast of fluid pressure is passed through the line 73, through the needle 70 and to the interior of the prawn shell.

At this time a pressure will be built up in the shell causing a swelling of the shell and a compaction of the prawn meat until the pressure within the shell blasts or expels the prawn meat from the shell against a stop plate 74. The peeled or ejected meat 60ᵃ is at this time free of the prawn shell and the operation upon the prawn has been completed.

As shown best in FIGURE 7 a prawn which has just been cored is being moved to the right in FIGURE 7 and the second belt edge positioning member 48 has just pushed a cored unpeeled prawn against a limit stop 66 carried by the belt edge limit stop member 45.

The member 45 under the influence of cams carried by the cam shaft 32 when the positioning of the prawn has been completed with respect to the edge of the belt will elevate and permit the belt to move the prawn from the position between the members 45 and 46. When the prawn has travelled on the belt 20 a distance to place it beneath the prawn gripping member 46ᵃ the member 46 descends upon the prawn to restrain and positively engage the same during the rapid insertion of the needle 70 and the blast of air or fluid into the shell to expel the prawn meat 60ᵃ therefrom.

Gripping member 46ᵃ then releases empty shell 60 on near edge of belt 20, whereas meat 60ᵃ was blown to the opposite edge of belt 20 which permits a suitable distance of separation of meat and shell on belt 20 for ease of mechanical segregation of meat and shell when discharged from belt.

It will, of course, be appreciated by those skilled in the art that timing and triggering means may be provided and interlocked with the mechanical structure to apply the source of vacuum to the coring member when the coring member has fully penetrated the prawn. In a similar manner it will be apparent that limit switches and appropriate solenoid controlled circuitry are applied to the device to cause the plunger 69 to drive the needle 70 into the telson section of the prawn when the prawn is in position and the prawn engaging member 46 and 46ᵃ have descended upon the prawn, and that further controls can be provided when the plunger is moved from the position of FIGURE 4 to that position shown in FIGURE 5. At this time fluid pressure will be applied to the line 73 to inject air or other fluid under pressure into the prawn shell. All timing and sequence of vacuum and air pressure systems are under synchronized operation of cam actuated solenoid switches and valves under the supervisory control of cam shaft 32.

I have found in practice that the fresher the prawn from the water, the higher the pressure that can be used to eject the meat from the shell. The prawn shells when subjected to high pressures have a rupture characteristic which is a function of age; that is to say, generally the older the prawn, the time interval between the prawn being taken from the water and subjected to the pressure of this invention, the more brittle the shell segment connecting the membranes become, and pressures have to be maintained in the lower range when operating upon older prawn.

I have also found as satisfactory a pressure operating range from 12 to 60 p.s.i. but this pressure is variable with the age of the prawn, the size of injecting needle, and angle of needle to axis of prawn tail. I have found also that the natural lubricants are lost with cold storage and that fresh prawn eject easier than older prawn or those kept in cold storage.

I have found that the temperature of the prawn when the air is injected into the shell for most satisfactory results will range from 34° to 80° Fahrenheit.

I have also found that previously frozen prawn boiled for 10 minutes and chilled in 70° F. water may be de-veined and ejected by the above methods but that the higher fluid pressure (35 to 80 p.s.i.) was required for ejection and de-veining was not always complete.

I have also found that when working with the coring device which is a water lubricated member that rotary motion is not only desirable to enter and remove the vein from contact with the meat and shell but that by rotating during withdrawal of the coring member the vein is more thoroughly removed.

The system illustrated for ejecting the meat from the prawn shell is a pneumatic system in which a blast of air is introduced between the meat and the shell. However, I have found water under pressure also operable for this purpose.

I have found also that the closer the needle is inserted into the shell to the anus the better the result.

A further modified method of removing the edible meats from the prawn tail sections is illustrated in FIGURES 8–14 in which the prawn is placed upon a table, belt or any suitable stationary surface and is restrained against such surface by a clamp and a strip plate is provided having an opening therethrough for passage of a rotating tube or hollow needle instrument 58ᵃ which is inserted through the opening in the strip plate and then is inserted into the prawn in such manner that the hollow needle enters the meat in a space adjacent to the mid-gut, or otherwise envelops and surrounds the mid-gut or vein to be removed.

Figures 8, 9:
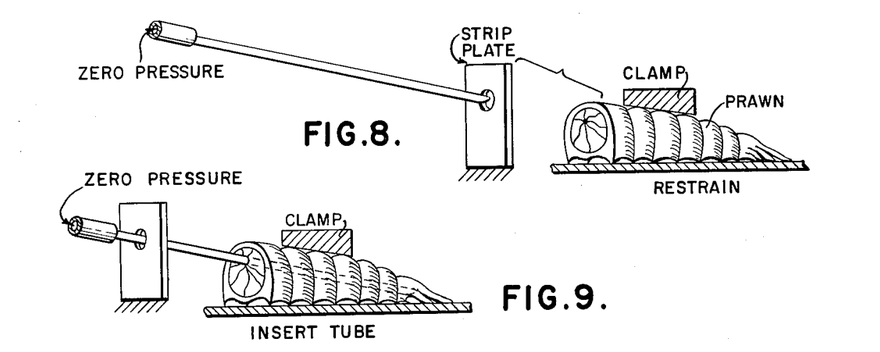
FIGURE 8 is a schematic view of a modified method of removing the edible meat and mid-gut or vein from a prawn in accordance with the present invention showing the prawn in position to receive the operating instrument.
FIGURE 9 is a view similar to FIGURE 8 with the instrument inserted in the prawn.
Figures 10, 11, 12, 13:
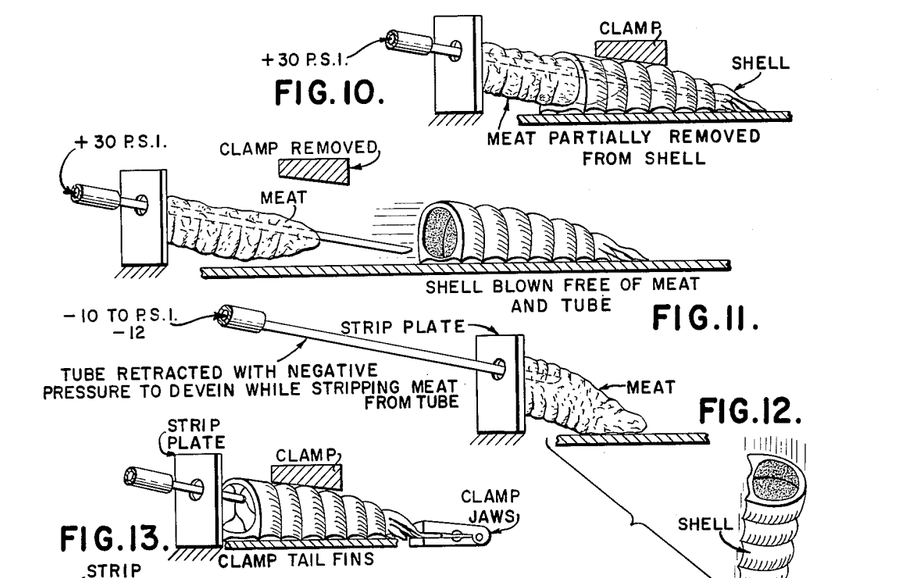
FIGURE 10 is a view similar to FIGURE 9 with the application of pressure to the needle showing the meat partially removed from the shell.
FIGURE 11 is a view similar to FIGURE 10 showing the meat completely removed from the shell and the shell being blown away from the edible meat.
FIGURE 12 is a view similar to FIGURE 11 showing the edible meat after removal from the shell being removed from the instrument.
FIGURE 13 is a schematic view of a modified method of removing the edible meat from the prawn with the aid of a tail clamp device and a fluid injection needle.
Figure 14:
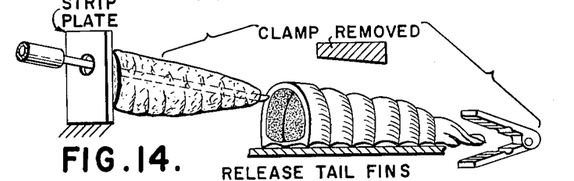
FIGURE 14 is a view similar to FIGURE 13 with the edible meat shown removed from the shell and the shell shown removed from the clamp.

The needle 58ᵃ is inserted into the prawn as shown in FIGURE 9 until the last section of the prawn tail is reached, this being called the telson section. As shown in FIGURE 10 a fluid pressure is applied to the needle which builds a pressure up within the shell and tends to eject the prawn meat from the open end of the shell and as shown in FIGURE 10, this meat is starting to become disassociated from the shell.

When sufficient pressure has been built up and the shell and meat begin to separate, the clamp is removed from engagement with the prawn and the prawn shell is completely expelled from the meat which remains upon the needle as shown in FIGURE 11.

When the shell has been expelled from the meat and the meat is to be removed from the needle a negative pressure or vacuum is applied to the hollow needle which causes the vein to be drawn through the needle and removed from the edible prawn meat as shown in FIGURE 12.

The strip plate then acts to remove the meat from the needle upon withdrawal of the needle to the left in FIGURE 12.

This process may be further modified with the use of a clamp means having jaws to prohibit rupturing of the telson section of the shell. When the meat has been removed from the shell, the clamp jaws are released from the telson section and the meat is removed from the needle in a manner similar to that of FIGURE 12.

Figures 15, 16, 18, 19:
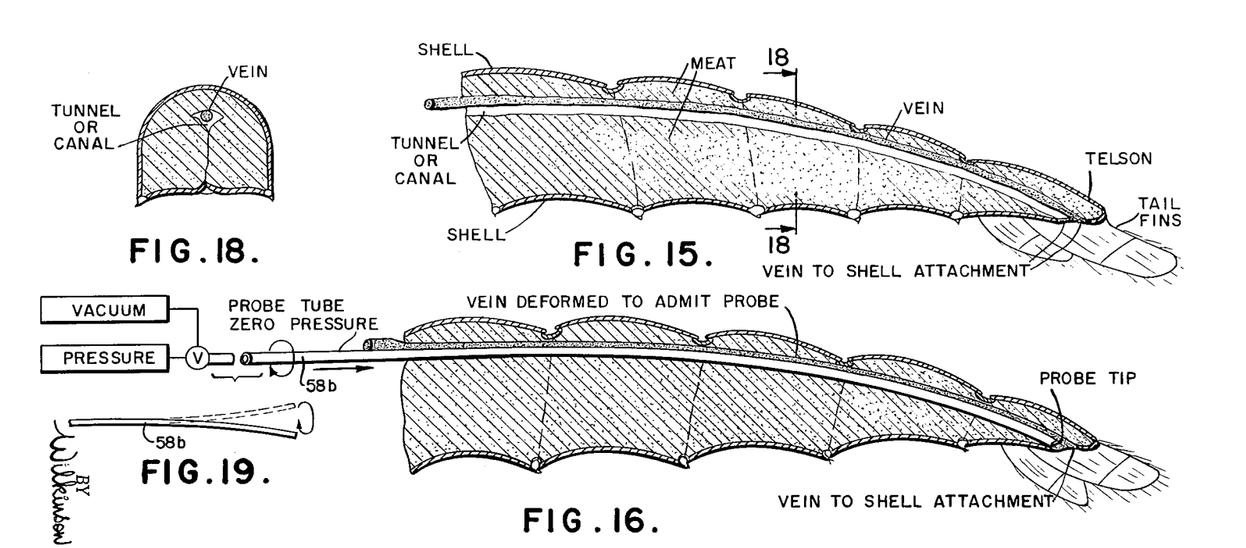
FIGURE 15 is a longitudinal sectional view taken through a crustacea tail illustrating the tunnel or canal occupied by the vein or mid-gut.
FIGURE 16 is a similar view showing the introduction of a hollow implement or probe into the tunnel beside the vein under approximately zero pressure.
FIGURE 18 is a cross-sectional view taken on the line 18—18 of FIGURE 15, showing the meat mass, tunnel and vein as the same exists in nature.
FIGURE 19 is a diagrammatic view of the tube indicating in an exaggerated way for clearness the path of the rotary movement of the curved end of the tube.
Figure 17:
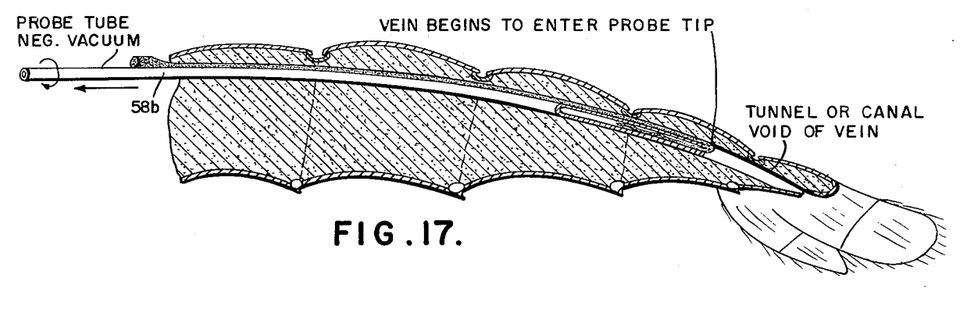
FIGURE 17 is a similar view showing the partial withdrawal of the hollow implement or probe tube under negative pressure to suck the vein out through the tube.

Referring more particularly to FIGURES 15 to 17 inclusive the implement 58ᵇ is a flexible hollow blunt-ended circular tube or probe which is inserted in the shell-off end of the exposed meat. The probe tube enters the meat in the hollow tunnel or canal provided by nature to contain the vein in its fully expanded condition. This is the path of least resistance for the probe tube to traverse the meat in a longitudinal direction.

The probe tube 58ᵇ enters the shell-off end and follows a path next to, or longitudinally adjacent to, the vein until the blunt end of the probe tube reaches the last segment or telson end of the shell near the anus. The tube is preferably rotated, as by means shown in FIGURE 3 or other means.

During the operation of such insertion, as shown in FIGURE 16, neither positive nor negative fluid pressure is introduced to the probe's hollow interior, and the vein or cord is not necessarily engulfed by the hollow probe 58ᵇ, but rather lies next to the probe tube and shares the space or tunnel in the meat mass together with the probe tube.

When the probe tube is driven all the way home the blunt end of the tube, still under rotation, ruptures the attachment of the vein or cord to the telson end of the hard shell segment by physically abrading or severing the vein at said point of attachment. During or after this abrading operation the outer end of the probe tube 58$^b$ is connected with a source of partial vacuum. As soon as the rotating probe tube begins to withdraw from the meat, its inner open end is exposed to the severed inner end of the vein and the negative pressure thereupon induces the inner end of the vein to be drawn within the inner end of the interior of the hollow probe tube.

As probe tube, still rotating and under partial vacuum, is slowly withdrawn from the meat, the vein which lies adjacent to the probe is progressively twisted by the rotating action of the probe tube, which in turn progressively detaches the vein from whatever slight adhesion it may have with the edible meat, and conveys the vein through the probe into a suitable container provided for the purpose.

This action not only removes the vein, but also vacuum cleans the vein tunnel of all foreign matter or small particles of edible meat which may have been detached from the main mass or bulk of edible meat. This cleaning action improves the market value of the edible meats.

As the leading tip of the probe tube is blunt, flexible and not precisely axially straight and true running, the rotating action of the probe tube 58$^b$ causes the tip to sweep an erratically circular path which, upon entry into meats, guides the probe tip through the meats into the area or path of least resistance and providing the least possible mutilation to meat and vein, and also upon its retraction from meats, rotation and erratic tip action completely sweeps and vacuum cleans the entire canal or tunnel within the meats' interior cavity.

The sequence and method of vein removal is similar whether meats are encased by shell or not.

FIGURE 19 shows that at its tip end the probe tube 58$^b$ is slightly curved in an axial direction. On rotation this end will therefore describe the erratic circular path referred to.

After the probe tube, by its action, severs the attachment of the vein from the shell, and before the withdrawing action of the probe tube and before the application of negative pressure to the probe tube, a positive pressure, such as indicated in FIGURE 10, may be applied through the probe tube to build up a pressure in the shell-on end to thereby drive the meat out of the shell or to blow the shell off the meat. Then the probe tube may be slowly withdrawn from the meat under vacuum, as shown in FIGURES 17 and 12, to de-vein while stripping the meat from the tube.

While the particular form of machine illustrated as an example of the invention shows the de-veining operation as performed prior to the shelling or peeling, the order could conceivably be reversed and these operations may be performed in any order.

FIGURE 16 shows the rotating hollow tube connectible by suitable valve arrangement selectively with sources of fluid under positive pressure and under negative pressure or vacuum.

The tubular implement may be inserted in the vein tunnel by hand and at suitable times manually rotated as when the leading end of the tube is driven home at the telson end of the tail to free the inner end of the vein from the shell and when withdrawing the tube; or the tubular implement may be rotated by machine power as illustrated more particularly in FIGURE 3.

Although I have disclosed herein the best form of the invention known to me at this time, I reserve the right to all such modifications and changes as may come within the scope of the following claim.

What is claimed is:

1. A machine for recovering edible meats from tails of hard-shelled type crustacea in which the shells are intact at one end of the tail but removed at the other open end for the discharge of meat masses, comprising (a) a movable endless belt for receiving crustacea tails in side-by-side relationship with their major axes across the belt,
   (b) crustacea spacing means positioned to space the tails along the run of the belt,
   (c) first belt-edge positioning means positioned to move the spaced crustacea to a position with the open ends exposed at an edge of the belt,
   (d) vein removing means positioned to engage the open ends of the tails as oriented by said first belt-edge positioning means and to remove the veins,
   (e) a second belt-edge positioning means positioned to engage the de-veined tails and move same to the opposite edge of the belt with its telson partially overhanging the edge of the belt,
   (f) crustacea grasping and retaining means positioned to grasp the crustacea as positioned by said second belt-edge positioning means, and
   (g) fluid injection means positioned to be inserted in the telson sections of the crustacea tails overhanging the edge of the belt to expel the meat substantially intact unmutilated from the open ends of the tail shells.

2. A device for recovering edible meats from tails of crustacea comprising
   (a) a tubular implement adapted to be inserted through the vein tunnel and sequentially connected to sources of positive and negative pressure to separate the shell and meat mass and to suck out the vein, said tubular implement being
   (b) rotary, and
   (c) curved at a leading end portion
   (d) so that on rotation the curved leading end portion describes an erratically circular path.

3. A machine for recovering edible meats from tails of crustacea comprising
   (a) a rotary tubular implement having
   (b) a leading tip offset at least slightly from the true axial line of the implement
   (c) so that on rotation the tip will describe an erratically circular path which upon entry into meats, guides the tip through the meats into the area or path of least resistance, providing the least possible mutilation to meats and veins, and upon retraction completely sweeps and cleans the entire tunnel, and
   (d) means for subjecting the implement interiorly to a controlled source of negative pressure.

4. A machine as claimed in claim 3 in which the tubular implement is
   (e) flexible, and the tip thereof is
   (f) blunt.

5. A machine for recovery of edible meats from tails of crustacea comprising
   (a) a rotary hollow implement adapted to be entered through the vein tunnel in the meat mass of a tail having
   (b) a tip leading end to contact an inner portion of a vein and breaks its attachment to the shell and on withdrawal to progressively twist the vein, detach the vein from whatever adhesion it may have with the meat mass, and
   (c) means for applying negative pressure to the implement on withdrawal to suck the vein from its inner end progressively into and through the tubular implement as the implement is withdrawn from the tunnel.

6. A device for recovering edible meats from tails of crustacea comprising
   (a) a rotary tubular implement having
   (b) a flexible tip portion adapted on rotation to flex into an erratically circular path,
   (c) means for rotating the tubular implement
   (d) so that the tip upon entry into meats will be guided into the area or path of least resistance and upon withdrawal will sweep the tunnel, and (e) means for connecting the tubular implement with a source of negative pressure for sucking the sand vein thereinto through the flexible tip as the tubular implement is withdrawn from the tunnel.

7. A device for recovering edible meats from tails of crustacea comprising
   (a) a rotary tubular implement open at its free leading end and adapted to be inserted through the tunnel of the sand vein,
   (b) means for rotating the implement whereby its free tip end will sever the attachment of the vein to the shell, and
   (c) means for connecting the tubular implement with a source of negative pressure as the tubular implement is withdrawn to suck the sand vein into and through the tubular implement.

8. A machine for recovering edible meats from tails of crustacea having shell-on and shell-off ends comprising
   (a) a support for the crustacea tail,
   (b) holding means engaging the shell of the crustacea tail to hold the same immovably to the support,
   (c) a stripping member adjacent said support,
   (d) a tubular implement slidable through the stripping member with its leading end portion adapted to enter through the shell-off end of the tail into the tunnel of the sand vein,
   (e) means for connecting the tubular implement to a source of positive pressure for separating the shell from the meat mass when the holding means is removed, and
   (f) means for connecting the tubular implement with a source of negative pressure as the implement is withdrawn through the stripping member to suck the sand vein from the tunnel and strip the meat mass from the tubular implement.

References Cited by the Examiner

UNITED STATES PATENTS

| | | | |
|---|---|---|---|
| 2,659,930 | 11/1953 | Jagger | 17—2 |
| 2,716,776 | 9/1955 | Streich et al. | 17—2 |
| 2,772,442 | 12/1956 | Matter | 17—2 |
| 2,784,450 | 3/1957 | Jonsson | 17—45 |
| 2,838,786 | 6/1958 | Ward | 17—2 |
| 2,850,761 | 9/1958 | Jonsson | 17—2 |
| 2,903,737 | 9/1959 | Ward | 17—45 |
| 3,110,926 | 11/1963 | Martin | 17—2 |

FOREIGN PATENTS 145,140    2/1952    Australia.

SAMUEL KOREN, *Primary Examiner.*

LUCIE H. LAUDENSLAGER, *Examiner.*